Sept. 29, 1964 V. V. PEONE 3,150,751
FLUID OPERATED SHAFT COUPLING
Filed March 21, 1963 2 Sheets-Sheet 1

INVENTOR.
VALLEYVIRGIL PEONE
BY *Norman H. Buff*

Sept. 29, 1964　　　V. V. PEONE　　　3,150,751
FLUID OPERATED SHAFT COUPLING
Filed March 21, 1963　　　2 Sheets-Sheet 2

INVENTOR.
VALLEY VIRGIL PEONE

United States Patent Office 3,150,751
Patented Sept. 29, 1964

3,150,751
FLUID OPERATED SHAFT COUPLING
Valley Virgil Peone, 6127 N. Lincoln St., Spokane, Wash.
Filed Mar. 21, 1963, Ser. No. 266,879
3 Claims. (Cl. 192—57)

The present invention is a continuation-in-part of my co-pending application Serial No. 33,692, filed June 3, 1960, now abandoned, and relates to fluid operated shaft couplings and more particularly to new and useful improvements in such couplings whereby the coupling elements may be mechanically fixed for one-to-one rotation and disconnected for infinitely variable ratios below said one-to-one ratio.

The improved fluid operated shaft coupling is designed to control the transmission of torque from a drive shaft to a driven shaft in variable ratios responsive to automatic or manual actuation of hydraulic fluid valving control means.

Among the objects of my invention are: to provide an improved fluid operated shaft coupling which may slip without injury to provide rotational differential between the driving and driven; and to automatically lock the shafts by mechanical means for coincident rotation thereby to avoid slippage when the shafts have substantially obtained coincident r.p.m.

It is a further object of the present invention to provide means by which the clutch may automatically return to mechanically secure the shafts for coincident rotation in the event of unintentional release of the locking means.

It is yet another object of the present invention to provide means whereby the fluid operated shaft coupling may be easily controlled either manually or automatically as desired.

It is yet another object of the present invention to provide a fluid operated shaft coupling which includes a fluid pump and a closed hydraulic circuit by means of which torque ratio from the driving shaft to the driven shaft may be varied in accordance with the restriction of flow of fluid in said circuit and wherein means are provided to automatically and mechanically connect the driving and driven shaft for coincident rotation when said shafts are rotating substantially coincidentally.

These and other objects and advantages of the present invention are attained by means of the physical embodiment illustrated in the accompanying drawings in which.

Figure 1:
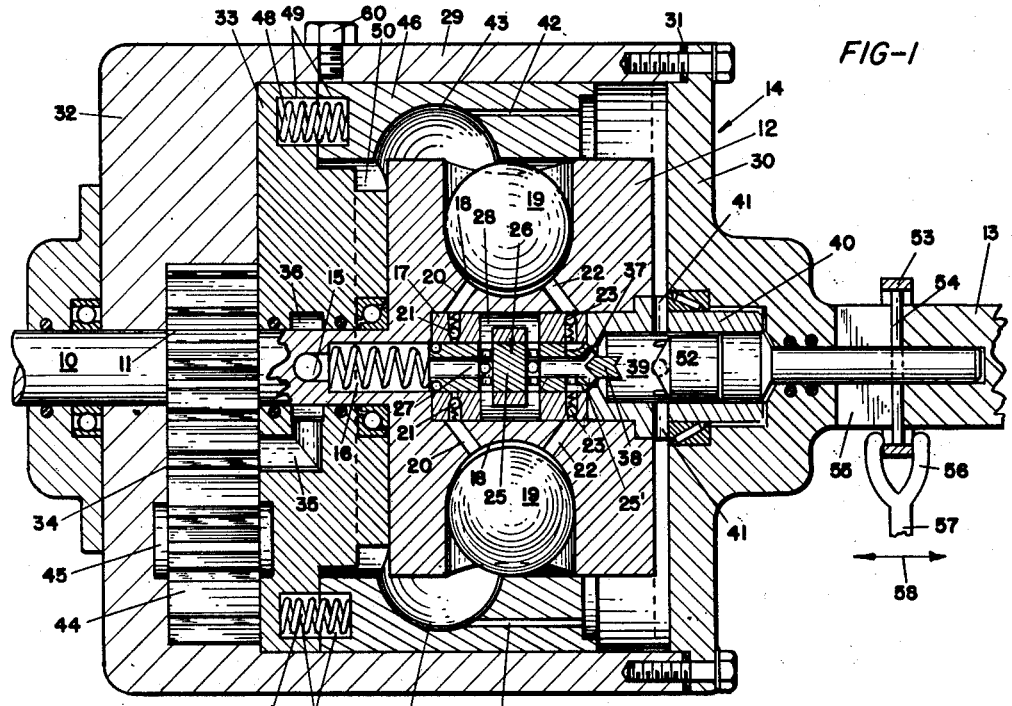
FIGURE 1 is a central axial cross sectional view of the coupling.

Having reference now more particularly to the drawing, it will be seen that my invention is provided with two relatively rotatable parts, firstly, a driving shaft 10, which non-rotatably carries a gear type fluid impeller 11 and a cylindrical rotor 12; and secondly, a driven shaft 13 rigidly carrying the housing indicated in its entirety by the numeral 14, within which the rotor 12 and the fluid impeller 11 are free to rotate. Although the device is essentially what is commonly known as a clutch, because of its particular mode of operation it does possess some of the features of a transmission of the mechanical fluid type as will be observed hereinafter. The driving shaft 10 is rotated by a source of rotary motion (not shown). The direction of rotation of the driving shaft 10 is counter-clockwise as viewed from the leftward end of FIGURE 1 and clockwise as viewed in FIGURES 3 and 4. Obviously, minor changes and reversal of parts will be effective to change the rotational direction, if desired. However, it will be understood that the rotational direction of driving shaft 10 may be in one direction only as it relates to any particular one of these couplings.

The housing 14 consists of the main cylindrical body portion 29 rigidly and non-rotatably secured to the flanged cap portion 30 by means of bolting through the flange into the cylinder and an oil seal 31 is placed therebetween to prevent leakage of oil at the juncture. The thickened end wall 32 of the cylindrical portion 29 of the housing 14 has a chamber 34 which receives the impeller 11 and its mating pinion 44, journaled on a stub shaft 45 and together constitute a gear type fluid pump 11–44. Removably fixed by bolts 33' within the cylindrical portion 29 is a dividing wall 33 which closes the compartments of the chamber 34 of the gear pump 11–44. At the discharge of the gear pump 11–44, I have formed in the wall 33 an oil duct 35 which carries the fluid from the pump to an annular reservoir 36. The oil then passes through a diametric bore 15 in a shaft 10 into an axial bore 16 formed in the shaft 10 and in the rotor 12.

For convenience of manufacture, I enlarge a portion of the bore 16 within the rotor 12 and insert a preformed sleeve 17, but for convenience of describing the invention, the sleeve 17 may be considered to be an integral portion of the rotor 12. The rotor 12 is provided with a number of cylinders, here shown to be two, but it will be understood that more cylinders may be provided in diametric pairs or otherwise provide for dynamic balance. This is indicated by dotted lines of FIGURE 3. Disposed within each cylinder is a piston 19 which, for convenience, is shown to be spherical, but which may assume other shapes if desired. Communicating with each cylinder 18, from the bore 16, is an oil duct 20 provided with a check valve 21 to permit flow of oil from the bore 16 to the cylinders 18 and prevent its back flow therefrom, as indicated by the arrows in the ducts. The cylinders 18 also communicate with the bore 16 at locations spaced from the first named ducts 20 by other oil ducts 22—22. The flow of oil in these ducts 22—22 is restricted to movement in one direction only from the cylinders 18 into the bore 16 as indicated by the arrows, by check valves 23 in their respective ducts.

A compression spring 24 is contained within the bore 16 and yieldably urges valve 25 rightwardly as viewed in FIGURE 1 into contact with stop 25' to accurately position the valve as shown in FIG. 1. The valve is provided with a central disc portion 26 which interrupts an axial bore 27. When the valve is in the first position as shown in FIGURE 1, fluid from the pump chamber 34 passes through the duct 35 into the bore 16 and thence into segmented valve bore 27. Since the disc portion 26 prevents its flow on through the bore 27, it passes outwardly through an annular by-pass 28 and back into the bore 27. The fluid then passes through obliquely radiating ports 37 about a valve operating boss 38 into the control valve chamber 39, which chamber is contained within a machined plug 40 having radially disposed discharge orifices 41 which permit the fluid to pass radially over the right hand end of the rotor 12 from whence it passes through restricted ports 42 into piston sockets 43.

The piston sockets and restricted ports are formed in a sleeve 46 fixed within the housing 14 against rotation relative thereto but axially movable therein within limits. The sleeve 46 may be slidably secured by means of diametrically opposed keys 47. Obviously, splines may be employed if desired, the function sought being axial movability of the sleeve 46 between the full line position of FIGURE 1 and the full line position of FIGURE 2. The sleeve 46 is normally held in the full line position of FIGURE 2 by means of an annular series of compression springs 48 having their ends disposed in axially aligned sockets 46 formed in the wall 33 and the sleeve 46. When the sleeve 46 is in the position shown in FIGURE 1, the fluid may then pass through the restricted ports and piston sockets 43 and thence discharge into the chamber 50 formed by relieving a portion of the wall 33.

Figure 3:
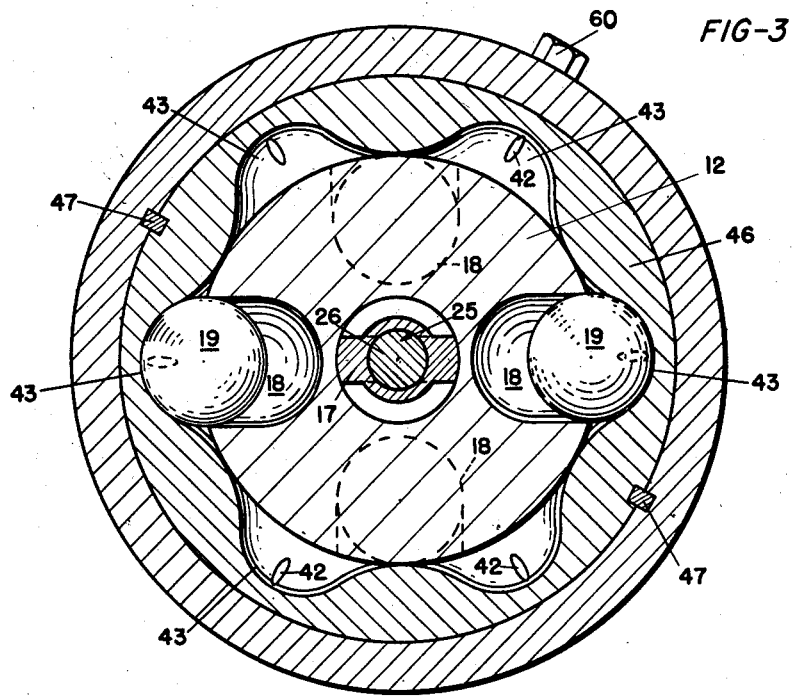
FIGURE 3 is a lateral cross sectional view taken substantially on the plane indicated by line 3—3 of FIGURE 2 and viewed in the direction indicated by the arrows.
Figure 4:
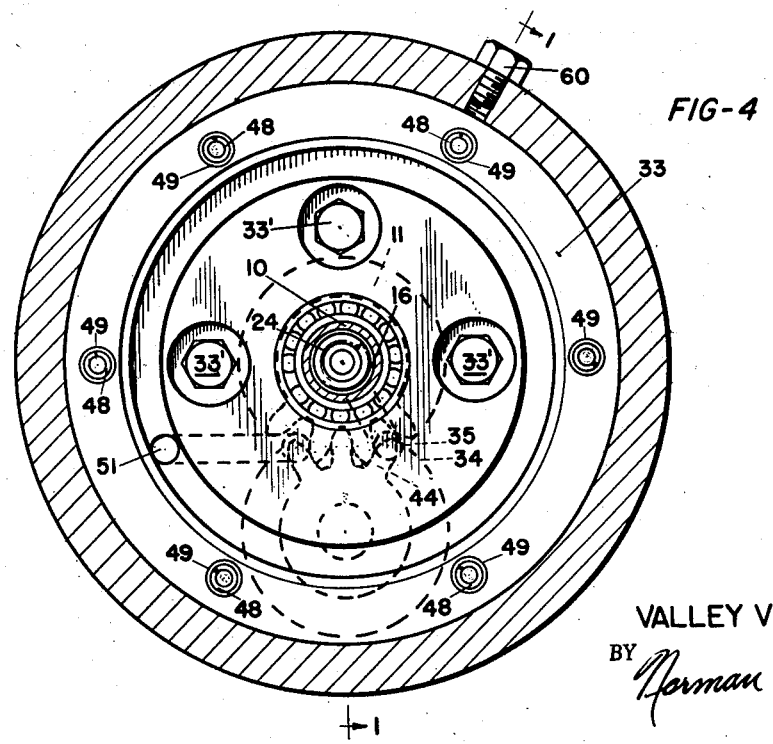
FIGURE 4 is a lateral cross sectional view taken substantially on the plane indicated by line 4—4 of FIGURE 2 and viewed in the direction indicated by the arrows.

The suction side of the gear pump 11–44 is apertured at 51 in the chamber 50 and is ducted through the wall 33 or base 32 thus completing a closed fluid circuit, which is filled through filler plug 60. In FIGURE 3 I have shown six piston sockets 43 but it will be understood that the rotor having but two pistons, a minimum of two piston sockets is desirable and more or less may be provided when required for a particular use. Preferably, there will be the same number of piston sockets 43 as there are pistons 19 and these sockets will be located relative to each other coincidentally to the relative location of the pistons 19.

A control valve 52 is disposed for axial movement with respect to the driven shaft 13 and moves into and out of the control valve chamber 39.

For convenience of illustration, I have shown an annular ring 53 which has a diametric bar 54 extending through an aperture 55 formed in the driven shaft 13 so that movement of the ring 53 longitudinally of the shaft will effect movement of the valve 52. The ring 53 is rotatably mounted with respect to the bifurcation 56 of the operating lever 57 which is movable in both directions as indicated by the arrow 58. This lever 57 may be actuated by manual energy or by automatic governor means as, for example, a ply ball governor. Other means of actuation may be employed if desired.

When the lever 57 is actuated leftwardly as seen in FIGURE 1, to a point wherein the valve 52 contacts the boss 38 but does not compress spring 24, the fluid flowing from the bore 27 is restricted to pass by the valve 52 outwardly through the orifices 41, thus a back pressure is created against the gear pump 11–44 and the rotational energy applied at driving shaft 10 will, in degree, be transmitted through the housing 14. Since the idler pinion 44 cannot rotate as freely as if the fluid were being discharged easily from the pump chamber, the housing 14 will rotate in ratio to shaft 10.

Obviously, slight variations of position of the valve 52 with respect to the orifices 41 will vary the back pressure of the fluid, thus providing for infinite variations in speed ratio between the driving shaft 10 and the driven shaft 13.

Figure 2:
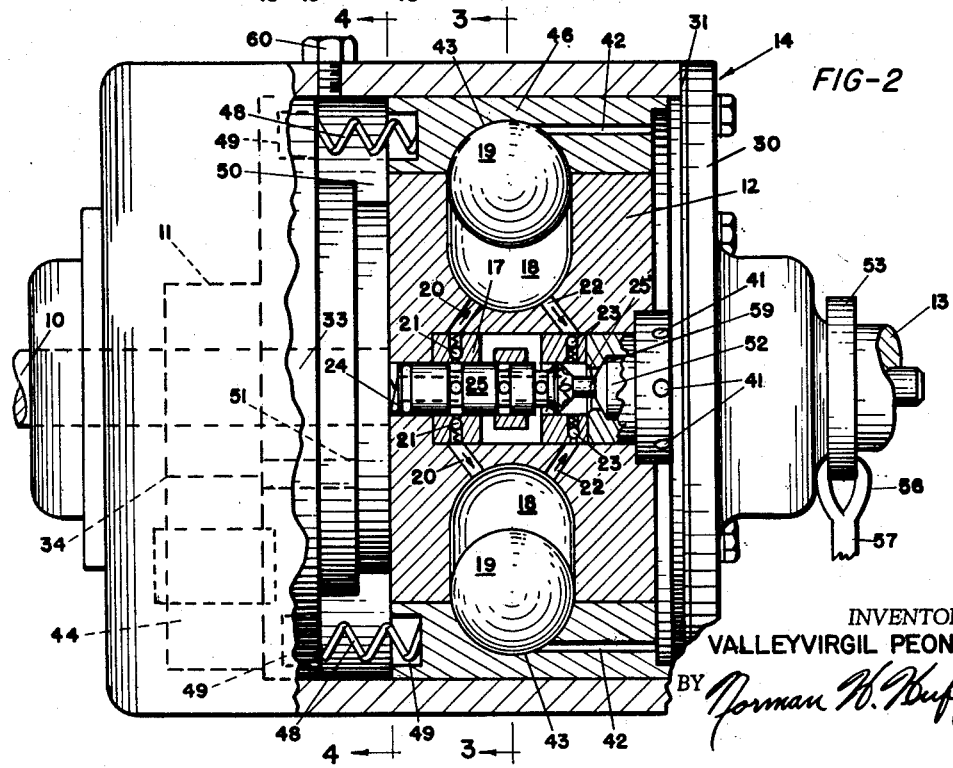
FIGURE 2 is a view substantially the same as FIGURE 1 but showing parts in an alternate position.

When the lever 57 is moved leftwardly to its limit, the conical point of the valve 52 will contact the operating boss 38 and shift the valve 25 to the position shown in FIGURE 2 at which time fluid flow is completely closed off at the valve seat 59 and the pressure holding the sleeve 46 in the full line position of FIGURE 1 is relieved by leakage through the restricted ports 42. Springs 48 then move the sleeve 46 to the full line position of FIGURE 2. It will be understood that a small amount of fluid leakage between the rotor 12 and the sleeve 46 is permissible, in fact, desirable, to permit this movement of the sleeve 46. Simultaneously with the valve 52 being seated in the seat 59, the flow of fluid from bore 16 is directed through port 20 into the cylinders 18, thus forcing the pistons 19 to mechanically engage with the sleeve 46 as shown in FIGURE 2. The pressure built up in the cylinders 18 endeavors to escape through the ducts 22 but is prevented from so doing by reason of the valve 52 being seated on the seat 59.

In this configuration, the driving shaft 10 is locked mechanically to the driven shaft 13 in one-to-one ratio. Since it is economically impractical to machine every part to such a degree that there will be absolutely no leakage the pistons 19 may be forced by cam action of the piston sockets 43 back into the cylinders 18 as the fluid pressure contained in the cylinders diminishes by leakage, it being understood that when the shafts are locked for one-to-one ratio, the gear pump 11–44 is not providing additional fluid to compensate for this leakage. In this event, a slight rotation of the rotor 12 with respect to the housing 14 will cause rotation of the gear pump 11–44 and provide additional pressurized fluid for moving the pistons 19 to the positions shown in FIGURE 2. Obviously, the less leakage provided from the sockets 18 by the pistons 19, the less frequently this compensating motion will be required.

Having thus described my invention, I desire to secure by Letters Patent of the United States the following:

1. A fluid operated shaft coupling, comprising:
    a driving shaft with a rotor fixed thereto and having radially reciprocal pistons carried by said rotor for withdrawal within said rotor and extension therefrom;
    a driven shaft with a closed housing rotatably containing said rotor;
    a closed fluid filled circuit within said housing and including a fluid pump for circulating said fluid through said circuit in direct proportion to the rotational differential between said driving shaft and said driven shaft, whereby resistance to the flow of said fluid imparts rotational force from said driving shaft to said driven shaft;
    a diversion valve for selectively diverting the said fluid from said circuit to extend said pistons outwardly of said rotor;
    a sleeve fixed against relative rotation and axially slidable within said housing from a yieldably held operative position to an inoperative position;
    said sleeve having sockets adapted to receive a portion of said extended piston when said sleeve is in its operative position to releasably interconnect said rotor and said sleeve;
    means whereby fluid flowing through said circuit urges said sleeve toward its inoperative position; and
    a flow control valve for varying the resistance to fluid flow through said circuit downstream of said first named valve.

2. The invention defined in claim 1 and further characterized by said diversion valve having means responsive to the movement to the circuit closing position of said flow control valve for diverting said fluid flow simultaneously.

3. A fluid operated shaft coupling, comprising:
    a driving shaft with a rotor fixed thereto and having radially spheral pistons carried by said rotor for withdrawal within said rotor and extension therefrom;
    a driven shaft with a closed housing rotatably containing said rotor;
    a closed fluid filled circuit within said housing and including a fluid pump for circulating said fluid through said circuit in direct proportion to the rotational differential between said driving shaft and said driven shaft, whereby resistance to the flow of said fluid imparts rotational force from said driving shaft to said driven shaft;
    a diversion valve for selectively diverting the said fluid from said circuit to extend said pistons outwardly of said rotor;
    a sleeve fixed against relative rotation and axially slidable within said housing from a yieldably held operative position to an inoperative position;
    said sleeve having spheral sockets adapted to receive a portion of said extended piston when said sleeve is in its operative position to releasably interconnect said rotor and said sleeve;
    means whereby fluid flowing through said circuit urges said sleeve toward its inoperative position; and
    a flow control valve for varying the resistance to fluid flow through said circuit downwstream of said first named valve.

References Cited in the file of this patent

UNITED STATES PATENTS

| | | |
|---|---|---|
| 563,989 | Storey | July 14, 1896 |
| 985,046 | Martin et al. | Feb. 21, 1911 |
| 1,062,876 | Blymyer | May 27, 1913 |
| 1,548,349 | Cayla | Aug. 4, 1925 |
| 2,207,538 | Gaddoni | July 9, 1940 |
| 2,250,327 | Criner | July 22, 1941 |
| 2,435,244 | Stephens | Feb. 3, 1948 |
| 2,551,518 | Stephens | June 13, 1950 |

FOREIGN PATENTS

| | | |
|---|---|---|
| 292,505 | Great Britain | Nov. 15, 1928 |
| 591,429 | Great Britain | Aug. 18, 1947 |